(12) United States Patent  
Schofield et al.

(10) Patent No.: US 6,328,479 B1
(45) Date of Patent: Dec. 11, 2001

(54) MULTI-TERMINATOR OPTICAL INTERCONNECT SYSTEM

(75) Inventors: Philip W. Schofield, Oak Park; Anastasia Bardouniotis, Chicago, both of IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/317,513

(22) Filed: May 24, 1999

(51) Int. Cl.$^7$ .................................................. G02B 6/38
(52) U.S. Cl. .................. 385/65; 385/59; 385/60; 385/78; 385/83
(58) Field of Search ................... 385/54–60, 62, 385/63, 65, 70–78, 83

(56) References Cited

U.S. PATENT DOCUMENTS

| 4,184,742 | * | 1/1980 | Corrales | 385/78 |
| 4,323,300 | * | 4/1982 | Stewart et al. | 385/59 |
| 4,458,985 | * | 7/1984 | Balliet et al. | 385/65 |
| 4,753,515 |   | 6/1988 | Sato et al. | 385/59 |
| 5,214,730 |   | 5/1993 | Nagasawa et al. | 385/59 |
| 5,315,678 | * | 5/1994 | Maekawa et al. | 385/59 |
| 5,619,604 |   | 4/1997 | Shiflett et al. | 385/59 |
| 5,664,039 |   | 9/1997 | Grinderslev et al. | 385/59 |
| 5,729,644 |   | 3/1998 | Shiflett et al. | 385/59 |
| 5,809,191 |   | 9/1998 | Stevens et al. | 385/59 |
| 5,920,670 | * | 7/1999 | Lee et al. | 385/78 |
| 6,045,270 | * | 4/2000 | Weiss et al. | 385/59 |
| 6,168,317 | * | 4/2000 | Shahid | 385/71 |

* cited by examiner

Primary Examiner—Rodney Bovernick
Assistant Examiner—Juliana K. Kang
(74) Attorney, Agent, or Firm—Karl D. Kovach; David L. Newman

(57) ABSTRACT

MT ferrule. A polymer fiber optic MT ferrule includes hermaphroditic L-shaped halves having multiple fibers mounted in V-grooves formed within surfaces of ferrule halves. Ferrule halves include holed walls perpendicular to the major surface of the V-grooves for providing alignment of the ferrule to guide pins of an MT receptacle having an alignment assembly and an alignment member mounted within the alignment assembly to provide for precision alignment.

11 Claims, 4 Drawing Sheets

MULTI-TERMINATOR OPTICAL INTERCONNECT SYSTEM

TECHNICAL FIELD

This invention pertains to a fiber optic interconnect system and, in particular, a multiterminator (MT) parallel optical interconnect system.

BACKGROUND OF THE INVENTION

In lightwave communications, an optical transmitting device such as a laser or LED is connected to an optical fiber by directly butting the fiber to the active device, using lenses or mirrors to collect light from the laser or LED for transfer to the next stage, or by using an intermediate lightguide mechanism to collect the light from an active device and guide it to the fiber and take the light from the fiber for guiding it to the device which is to receive the optical data. Where a multifiber connector is used and the active device includes an array of optical fibers, an intermediate ferrule is typically used to align and mate the active sending device to a connector installed at the end of the optical fiber connector. The active device may be a light sending or receiving means. A ferrule is a block of plastic or glass with minute holes or light pipes extending through the block for conducting light from one end of the block to the other. The minute holes or light pipes of the light guide are intended to align optical fibers of ferrules in devices which are to be mated for transfer of optical data.

Optical fiber connectors having multiple fibers are known in the art. Such multi-fiber connectors are increasingly necessary as greater bandwidth applications are needed.

Multifiber connectors such as that in U.S. Pat. No. 5,214,730 show optical fiber ferrules formed by a pair of multifiber optical connector plugs having spring members for pressing the plugs toward each other in a direction axial to direction of ribbon cable inserted into the connectors. Guide pins are generally employed for aligning the multifiber optical connector plugs in an attempt to mate the ends of the individual fibers in arrays of optical fibers against one another to ensure good optical coupling, and hence effective transmission.

Generally, the array of fibers are mounted in V-grooves (U.S. Pat.No. 4,753,515) which are etched in a silicon material in order to provide for precision positioning of the fibers. Precision positioning of the fibers in the silicon block is imperative so that when two connectors are mated, the fibers align as closely as possible in order to limit any signal loss.

A typical fiber optic connector ferrule is shown in from U.S. Pat. No. 5,809,191, Stevens et al. It shows a single molded piece ferrule for receiving a multifiber cable of ribbon to provide at an open face of the ferrule having holes through which optical fibers pass. Guide pins extend parallel to one another from the ferrule for insertion into another ferrule for receiving guide pins in guide pin recesses.

Etched V-grooves can be put down with good precision, but it is difficult to bond them together and polishing them is also problematic. This results in a terminated ferrule having brittle surfaces and edges.

Another solution to alignment of optical fibers is shown in U.S. Pat. No. 5,664,039 by Grindersiev, where an array of optical fibers is held in grooves in a ferrule, and then these fibers are clamped into grooves with a second flat (ungrooved) ferrule member so fibers can be held precisely in the grooves. According to Grindersiev, this allows transmission through the connector with minimal fiber misalignment, since grooves hold the fibers securely. Grindersiev also teaches other a means for optimizing data transmission by using various designs for securing fibers in grooves through alternative designs of grooves—V-shaped, semicircular, etc.

Another method for improving alignment of optical fibers in an MT style ferrule is shown in Shiflett, U.S. Pat. No. 5,619,604. It teaches a guide prong for pre-alignment of the ferrule within a receptacle and a groove on that guide prong for mating with a rib of the receptacle.

There exists a long felt need in the art for fiber optic connectors which achieves the result of machining with high precision and accuracy in the submicron range to hold individual fibers of a fiber optic array in registration with both a ferrule in which its ribbon cable is inserted as well as a ferrule to which it will be mated with aligning guide pins.

The prior art (for example, Grindersiev) teaches improving alignment of optical fibers in two optical connectors through improvement of alignment of the fibers within a single ferrule. Other prior art solutions, Shiflett, U.S. Pat. No. 5,619,604, solve the problem of ferrule alignment by adding mechanisms to the ferrule; this not only increases the cost and complexity of a connector, but also adds an opportunity for error in the machining of additional components, such as those taught in Shiflett, U.S. Pat. No. 5,619,604.

A prudent solution to the problem of aligning optical fibers in connecting MT ferrules has evaded the prior art, but would be very beneficial to the fiber optic industry.

SUMMARY OF THE INVENTION

It is an object of the present invention to provide a multiple terminator ferrule which both provides grooves for holding optical fibers in an MT ferrule while eliminating common errors in the manufacturing of grooved ferrules.

According to the present invention, a fiberoptic MT style ferrule includes hermapbroditic halves which are L-shaped insofar as they have perpendicular legs, one leg of each L-shaped ferrule halve having parallel elongate V-grooves at a mating end and a recess at a fiber-receiving end, the other leg of each L-shaped ferrule halve constituting a wall and having a guide pin hole parallel to said grooves, the hole providing alignment of the ferrule to alignment members, or guide pins, of another MT ferrule such that when the halves are bonded together, the grooves and recesses overlap in order that ribbon cable received in an opening formed by the overlapping recesses, continues into optical fibers within said overlapping grooves which can emanate from said mating end for optical data transfer to another ferrule.

The ferrule accommodates multiple fibers. The ferrule is injection molded plastic having grooves therein for receiving optical fibers. The ferrule is terminated by inserting multiple optical fibers within grooves of the ferrule and securing the optical fibers within the grooves via chemical bonding and polishing the end face of the ferrule. The ferrule is formed of two halves each having a major surface having V-grooves therein and the halves each having a pair of walls including holes for alignment guide pins. The ferrule includes a mating end and a rear end having a collar mounted thereon. The ferrules halves are bonded together and the fibers are secured therein via adhesive.

One advantage of the presently invented ferrule is that its hermaphroditic design lessens manufacturing costs because its ferrule halves are identical. A further advantage, which flows from the first, is that the effect on the function of the ferrule of variations in the manufacture of a first half of the ferrule are minimized because the other half of the ferrule has the same variation, but positioned in the opposite direction with the result that the variations in the halves complement each other. For example, if two ferrules A and B are to be mated, each of A, B will be comprised of identical halves. Thus, ferrule A has a top half and bottom half and ferrule B has a top half and bottom half, and all four halves are identical. If the top half of manufactured ferrule A has a groove at location 'x', whereas the groove was designed for location 'y,' this irregularity will be matched by the same irregularity if any in the top half of a ferrule B—with which ferrule A would mate.

The prior art, in which a ferrule is made of a single molded piece having guide pin holes and holes for optical fibers, would not circumvent this error. In the prior art MT ferrule, a number of core pins equal to the eventual number of optical fibers to be enclosed by this ferrule are then inserted into this single molded piece for creating the holes for the fibers. The problem with this approach, solved by the present invention, is that each iteration of the core pin insertion is different from the prior iteration such that no two iterations produce the same ferrule. The error leads to two ferrules which are to be mated but which may have fibers that are misaligned. In the course of manufacturing perhaps a hundred thousand ferrules, the room for error is large.

According to the invention, differences between a designed ferrule part the manufactured actual ferrule are less likely to lead to a faulty mating of ferrules, even if there is a manufacturing irregularity in the ferrule. Moreover, differences between successive batches of manufactured ferrules will all function correctly and identically even if those successive batches produce nonidentical ferrule halves.

These and other features of the invention are set forth below in the following detailed description of the presently preferred embodiments.

A more complete appreciation of the invention and many of the attendant advantages thereof will be readily obtained as the same becomes better understood by reference to the following detailed description when considered in connection with the accompanying drawings, wherein:

WRITTEN AND DETAILED DESCRIPTION OF THE PRESENTLY PREFERRED EMBODIMENTS

Figure 1:
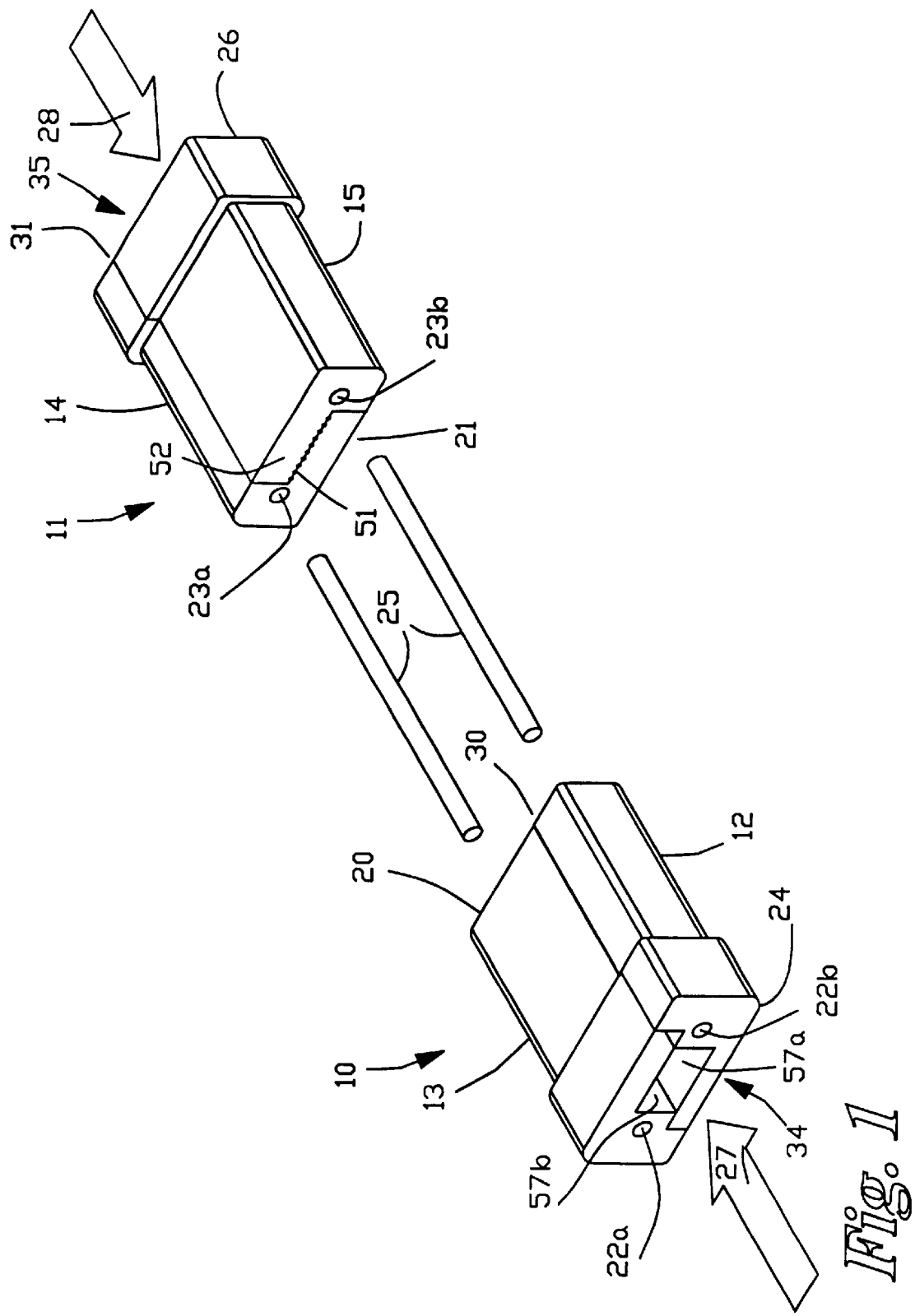
FIG. 1 is a perspective view of ferrules of the present invention.
Figure 2:
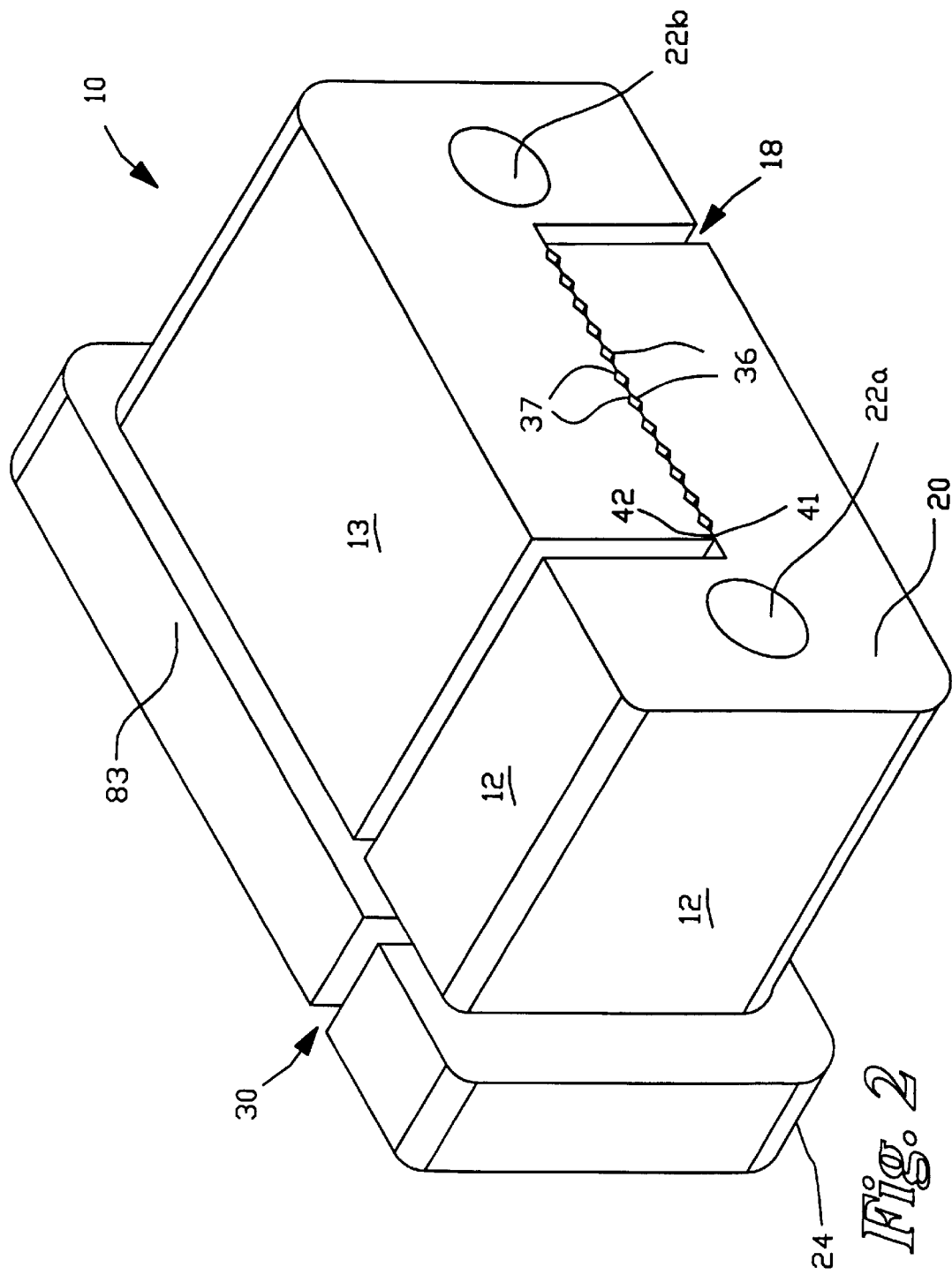
FIG. 2 is a perspective view of the ferrule of the fiber optic interconnect system of the present invention.

In FIGS. 1,2 shows a pair of MT ferrules 10, 11 according to the present invention. Each ferrule assembly 10 further includes two halves 12, 13, 14, 15. Each ferule half 12, 13, 14, 15 has a mating end 20, 21 where optical fibers (not shown) in overlapping grooves 36, 37, 51, 52 in the ferrules 10, 11 connect to one another at their mating ends 20, 21 and a fiber-receiving end 24, 26 for receiving a pair of optical fiber ribbons 27, 28 which are enclosed in the grooves 36, 37, 51, 52. To form each ferrule 10, 11 the ferrule halves 12, 13, 14, 15 are bonded together with adhesive(not shown), except along a gap 30, 31, which allows excess adhesive to seep out through the gap 30, 31 and away from grooves 36, 37, 51, 52. Each half 12, 13, 14, 15 includes holes 22a, 22b, 23a, 23b extending from their mating ends 20, 21 of the ferrule half 12 to fiber-receiving end 24. The purpose of holes 22, 23 in ferrule halves 12, 13, 14, 15 is for receiving guide pins 25 which align the ferrules 10, 11 leading to alignment of optical fibers and provide a low optical communications loss. An opening 34 in ferrule 10 is for receiving the ribbon cable 27 is formed of recesses 57a, 57a in each ferrule half 12, 13. Similarly, ferrule 11 has an opening formed of recesses in ferrule halves 14, 15 for receiving ribbon cable 28.

FIG. 2 shows ferrule 10, including ferrule halves 12, 13 joined except at the gap 30. Holes 22a, 22b also extend from the fiber-receiving end 24 to the mating end 20. Each half 12, 13 includes a surface 41, 42, having a plurality of overlapping V-shaped grooves 36, 37 which are co-spatial insofar as the spaces out of surfaces 41 formed by these grooves 36 are overlapping—somewhat like concentric top and bottom semi-circles which together form a single circle. Here, the grooves 36, 37 overlap to create a diamond shaped groove for enclosing an optical fiber. Ferrule halves 12, 13 are identical and hermaphroditic and the elements for the one are identical to the other.

Figure 3:
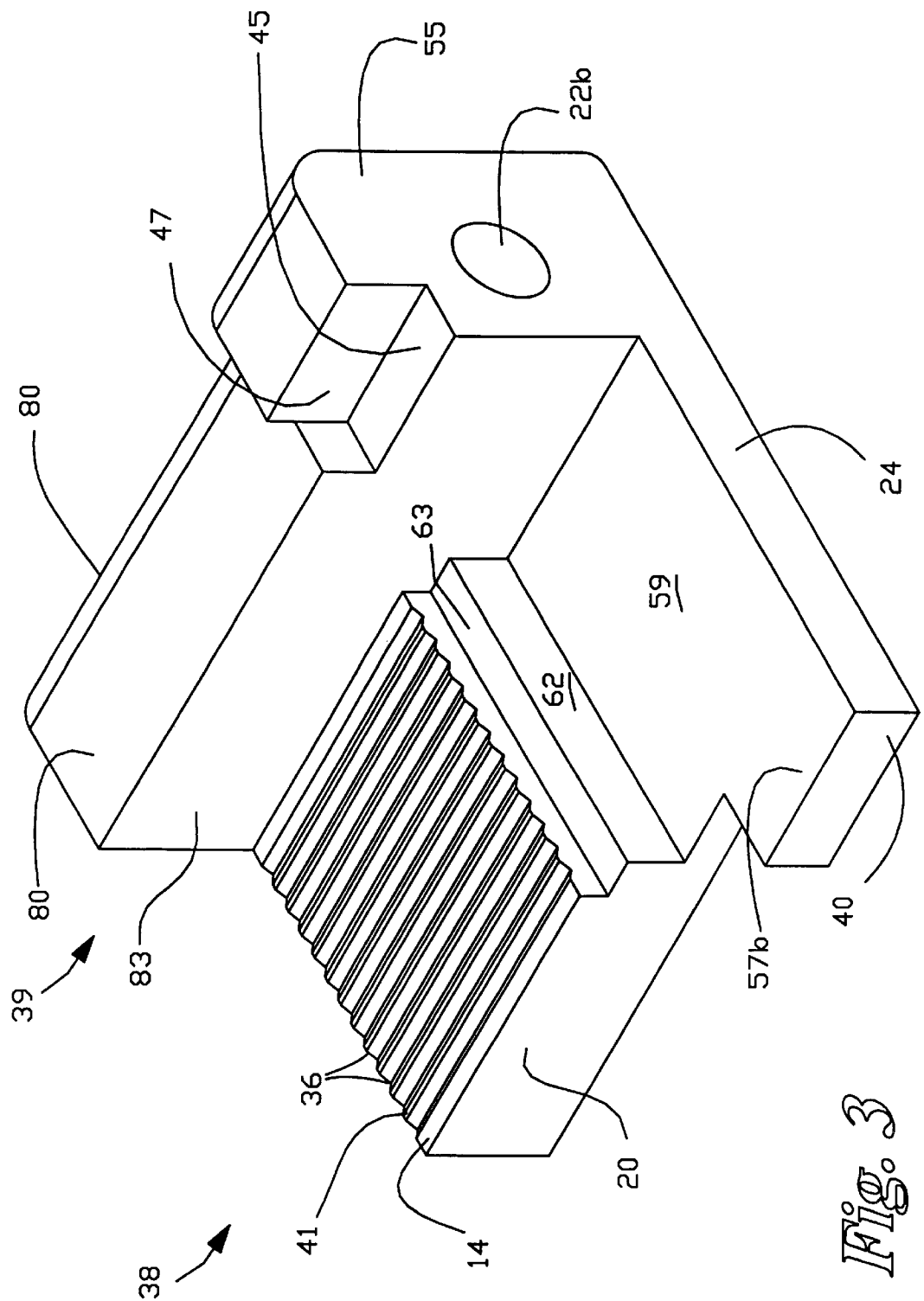
FIG. 3 is a perspective view of a ferrule half of the present invention.

Single ferrule half 12 includes mating end 20 shown in FIG. 2 and fiber-receiving end 24 shown in FIG. 3. The ferrule half 12 includes a surface 41 near mating end 20. Multiple optical fiber grooves 36 are formed in surface 41. In a preferred embodiment, these are fiber-alignment grooves 36, also called V-grooves 36, as the grooves are tapered. In one embodiment, twelve V-grooves 36 are formed along the major upper surface 41 of the ferrule half 12, but the number can vary from twelve. The V-grooves 36 are precision-formed to hold optical fibers.

At the fiber-receiving end 24 of the ferrule half 12, is a recess 57b formed by bottom surface 59 for receiving an optical fiber ribbon cable 27 (FIG. 1). The recess 57b communicates with the V-grooves grooves 36 so that when ribbon cable 27 is placed in the recess 57b the individual stripped optical fibers may be mounted in the V-grooves 36. The recesses 57a, b of two ferrule halves 12, 13 (FIGS. 1, 2, 4) overlap to form an opening 34 (FIG. 1) at the fiber-receiving end 24 of the ferrule 10. Surfaces 59, 62, 63 can be flat—for forming a series of steps, or angled—for the purpose of funneling normally flexible ribbon cable 27 or optical fibers onto surface 41 or V-grooves 36. The opening 34 formed by overlapping recesses 57a, b is generally rectangular when the two ferrule halves 12 are mounted together. A collar 55 is an integrally molded portion of ferrule half 12 at fiber-receiving end 24.

Figure 4:
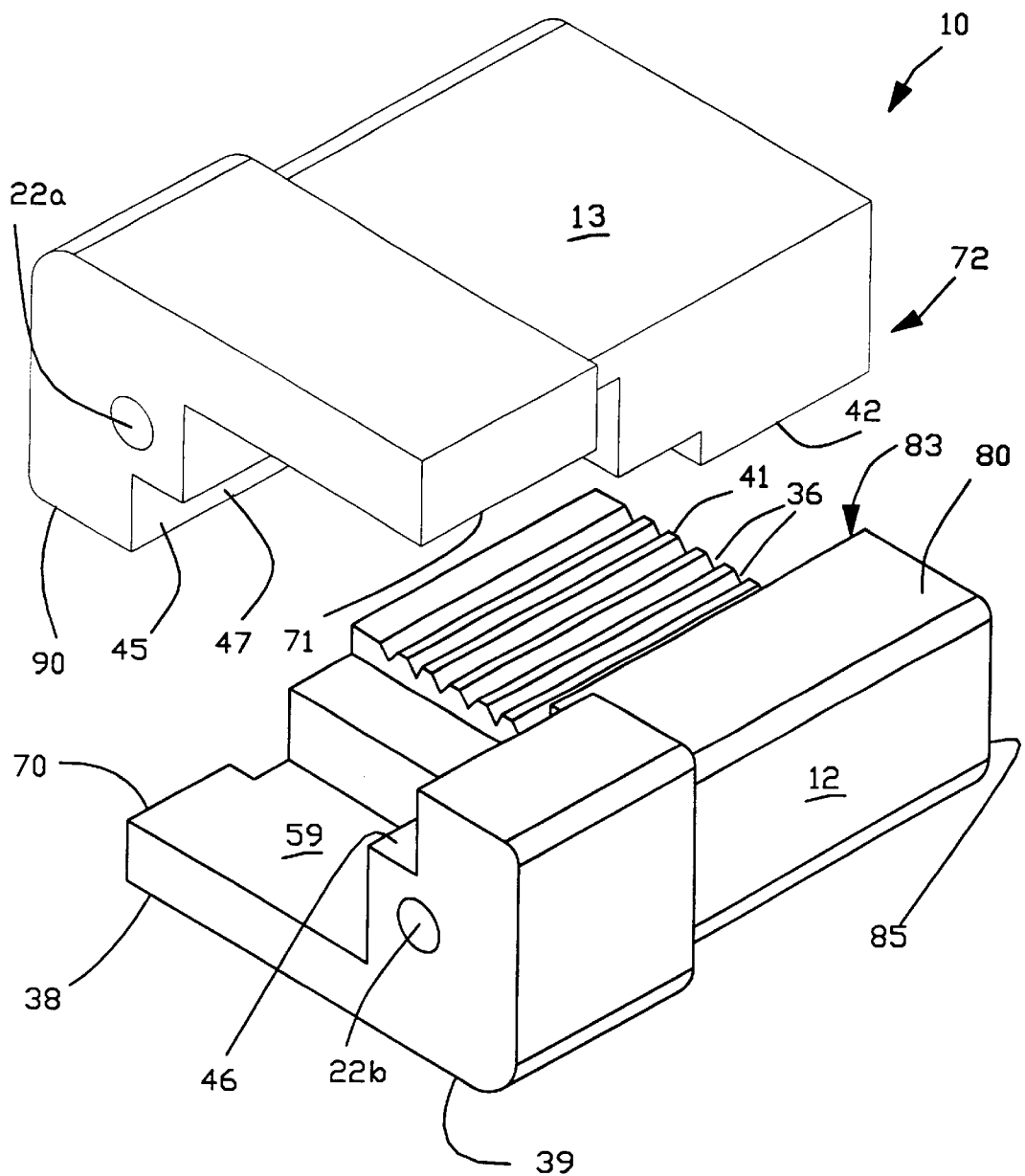
FIG. 4 is an exploded view of a ferrule of the present invention.

FIG. 4, ferrule 10 is comprised of ferrule half 12 which is positioned below ferrule half 13, as the halves would be just prior to ribbon fiber 27 (FIG. 1) and fibers in the ferrule 10. An alignment tang 70 protrudes from a second side 39 of the ferrule half 12. The tang 70 may be rectangular in shape and integrally molded with the ferrule half 12. A slot 45 is above the tang 70 on the first side 38 of the ferrule half 12. The slot 45 is the same shape but slightly larger than the tang 70 to accommodate it during mating of ferrule halves 12, 13. The slot 45 receives the tang 70 of ferrule half 12. And slot 46 of ferrule half 12 receives tang 71 of ferrule half 13.

In FIG. 4, the slot 45 forms a recessed area having a backwall 47. The slot 46 is open along the second side 39 of ferrule half 12 so that when the tang 71 of the ferrule half 13 may be moved towards the slot 46 and mated within the slot 46. Likewise, the tang 70 of bottom ferrule half 12 may be inserted within a slot 45 of ferrule half 13. Hermaphroditic design of ferrule halves 12, 13 allows for an individual mold to provide the two halves which can then be intermated together via tangs 70, 71 being inserted within the slots 45, 46 of the other ferrule halves 12, 13.

These tangs 70, 71 and slots 45, 46 provide for alignment for the ferrule halves 12, 13 in order to aid in the assembly of the ferrule 10. The ferrule halves 12, 13 can be assembled according to the following steps: the optical fibers are mounted within the V-grooves 36 of the ferrule half 12; epoxy is then applied to the optical fibers at the mating end 20 along the surface 41 to secure the fibers; and one ferrule half 13 is then mounted onto the other ferrule half 12; the optical fibers in the optical grooves 36, 37 act as alignment guides at the mating end 20, 21 and tangs 70, 71 act as alignment means for the ferrule halves 12, 13 at the fiber-receiving end 24. By aligning the tang 70, 71 into the slots 45, 46 the ferrule halves 12, 13 are mounted in a co-linear orientation.

In an embodiment, the ferrule halves 12 are molded of a polymer material such as a liquid crystal polymer. The V-grooves 36 are injection molded using the precision molding techniques as discussed above. Simultaneous to the molding of the mating end 20 including the alignment grooves 36, the fiber-receiving end 24 is molded including all of the alignment features discussed above. It will be observed that the advantages of having a molded ferrule 10 allow for the simultaneous molding of these alignment features molded integrally with the mating end 14 of the ferrule halves and provides for a quickly and inexpensively manufactured ferrule including these alignment features so that additional parts or components are not needed within the connector assembly.

An upward wall 80 protrudes from the first major surface 41 toward second major surface 42 on ferrule half 13. The wall 80 spans at or near the first side 38, herein defined to include surfaces that extend orthogonal or in a bisecting direction to the surface 41. The upward wall 80 has a first outer surface 85, and a first interior surface 83.

In FIG. 4, top ferrule half 13 includes wall 90 facing downward that spans the second major surface 42 axially along the direction of mating as wall 80 of the bottom ferrule half 12 faces upward. In this embodiment, when the bottom and top ferrule halves 12, 13 are juxtaposed into ferrule 10, the upward and downward vertical walls 80, 90 prevent seepage of adhesive except through gaps 30, 31 (FIGS. 1, 2). The embodiment achieves an advantage over the known prior art in that top and bottom ferrule halves 12, 13 may be joined by adhesives without dripping.

The advantage of this invention is that the ferrule 10 may be assembled in the field to engage an optical receptacle and precisely align with an opposing connector of a same or differing form factor. Moreover, whereas the prior art MT ferrules are a single molded piece, the present ferrule invention is made of halves. One advantage to this design, is that because both top and bottom halves 12, 13 are formed of the same hermaphroditic piece, irregularities in the forming of V-grooves 36 are cancelled by the same irregularities in V-grooves. Thus, an error in a groove of ferrule half 13 is aligned with an error in ferrule half 12 to which it is mated. In other words, when mating the ferrule halves, position pitch of a V-groove in a ferrule half 13 is mated by a corresponding pitch in a corresponding V-groove in ferrule half 12. The mating of the errors cancel one another out.

A further preferred method of assembling and terminating the ferrule 10 is as follows. Assembly of the ferrule 10 after it is injection molded is accomplished by placing core pins (not shown) in the grooves 36 of the first half 12 (see FIG. 3). The major surfaces 41 of mating halves 12 are then placed together to enclose the core pins between the two halves 12, 13. The two halves 12, 13 are then secured together, for example, by chemical bonding or sonic welding. A collar 55 (see FIGS. 2, 3) which is injection molded simultaneously as part of the ferrule half 12 includes a recess 57b from which the core pins may protrude. In an alternate embodiment, a separate collar is secured around the rear body of the ferrule halves 12, 13. The core pins have a diameter just slightly larger than the diameter of the optical fibers to be replaced in the grooves. For example, the core pins may have a diameter of approximately 0.1255 microns. The core pins are removed, leaving the ferrule 30 having V-groove passages which are precisely aligned between the top half 13 and bottom half 12 and are free from any disturbance along their passage walls such as misalignment of the V-grooves of the ferrule halves 12, 13. The ferrule 10 being assembled in this manner may then be quickly and easily terminated according to the description below.

The fibers are then secured within the ferrule 10 via chemical bonding such as injection of an anaerobic adhesive within the ferrule. For example, a primer such as Locquic® Primer N7649 (Loctite Corp., Rocky Hill, Conn.) is used with a hardener such as RC™ 680 Retaining Compound High Strength (Loctite Corp., Rocky Hill, Conn.). Anaerobic adhesives are preferred because they cure upon exposure to air and adhere well to plastics. Alternate chemical bonding methods may also be used such as epoxies used with curing ovens. The adhesive may be injected from either end of the ferrule 10 or through opening 34. The adhesive secures the fibers within the V-grooves 36 of the ferrule 10 and also secures the ferrule halves 12, 13 together.

After the adhesive has cured, the optical fibers are then cleaved and polished. The ferrule mating end 20 may also have molded around the V-grooves 36 a polishing pedestal such as that disclosed in U.S. Pat. Nos. 5,333,223, and 5,193,133 which are incorporated herein by reference. The end face of the ferrule 10 is polished using standard polishing procedures so that the optical fibers are in an optimal condition for transmission. The aforementioned termination procedure may be easily accomplished in the field by technicians. This termination process is similar to termination methods for single fiber ferrules such as SC connectors and is repeatable with a high rate of success. Due to the novel construction of the multi-fiber ferrule of the present invention, and the preassembly of the ferrule halves into a single ferrule unit 10, the termination process is accomplished quickly and easily.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. An optical multifiber planar array ferrule with alignment members comprising:
   a pair of mating, hermaphroditic ferrule halves,
   each hermaphroditic ferrule half having a fiber-receiving end and a mating end, the fiber-receiving end for receiving a planar array of at least two optical fibers in a recess formed therein, the mating end for exposing ends of the at least two optical fibers;

each hermaphroditic ferrule half having a first leg, each hermaphroditic ferrule half having a second leg, each of the first legs of the hermaphroditic ferrule halves containing parallel elongated grooves for containing the at least two optical fibers, each of the second legs of the hermaphroditic ferrule halves containing a hole for receiving a guide pin, and wherein said hermaphroditic ferrule halves are assembled such that their mating ends are matched to one another, the fiber-receiving ends are matched to one another, and the second leg of each hermaphroditic ferrule half is matched to the first leg of the other hermaphroditic ferrule half, the assembled hermaphroditic ferrule halves having an opening for the planar array of at least two optical fibers, the opening being formed by the overlapping of each recess formed in the fiber-receiving end of each of the hermaphroditic ferrule halves, the bonded hermaphroditic ferrule halves having a space for the at least two optical fibers from the overlapping parallel elongated grooves of the two bonded hermaphroditic ferrule halves, the at least two optical fibers received at the fiber-receiving end and exiting the ferrule at the mating end.

2. The ferrule of claim 1, wherein each hermaphroditic ferrule half further comprises an alignment tang at the fiber-receiving end and a slot at said fiber-receiving end, the tang of each hermaphroditic ferrule half for mating and insertion into the slot of the other hermaphroditic ferrule half.

3. The ferrule of claim 1 wherein each hermaphroditic ferrule half includes at the fiber-receiving end an alignment tang at a first side and a slot at a second side, the tang of one hermaphroditic ferrule half for filling the slot of the other hermaphroditic ferrule half when the two hermaphroditic ferrule halves are mated.

4. The ferrule of claim 1 wherein the first leg of the hermaphroditic ferrule half is parallel to the first leg of the other hermaphroditic ferrule half when the hermaphroditic ferrule halves are assembled to form a single structure, and wherein the second leg of the hermaphroditic ferrule half is parallel to the second leg of the other hermaphroditic ferrule half when the hermaphroditic ferrule halves are assembled to form the single structure.

5. The ferrule of claim 1 wherein the grooves are wider at a surface than at a base.

6. The ferrule of claim 1 wherein the ferrule includes a collar mounted thereon.

7. The ferrule of claim 1 wherein the grooves are tapered and the hermaphroditic ferrule halves are L-shaped.

8. The ferrule of claim 1 wherein said hermaphroditic ferrule half has an L-shape, said first leg and second leg of said each hermaphroditic ferrule half constitutes the L-shape.

9. An optical fiber ferrule half, having a fiber-receiving end and a mating end, the fiber-receiving end having a recess formed therein for receiving a ribbon cable having at least two optical fibers, the mating end for presentation of the at least two optical fibers, containing parallel elongated grooves for containing the at least two optical fibers, and containing a hole for housing a guide pin, and wherein a length of the hole is substantially parallel to a length of the elongated grooves, and wherein said optical fiber ferrule half has an L-shape, a first leg of the optical fiber ferrule half constitutes one portion of said L-shape and a second leg of the optical fiber ferrule half constitutes a second portion of said L-shape.

10. The optical fiber ferrule half of claim 9 wherein the optical fiber ferrule half further comprises an alignment tang at said fiber-receiving end and a slot at said fiber-receiving end.

11. The optical fiber ferrule half of claim 9 wherein the optical fiber ferrule half includes, at the fiber-receiving end, an alignment tang at a first side and a first slot at a second side.

* * * * *